Patented Sept. 19, 1950

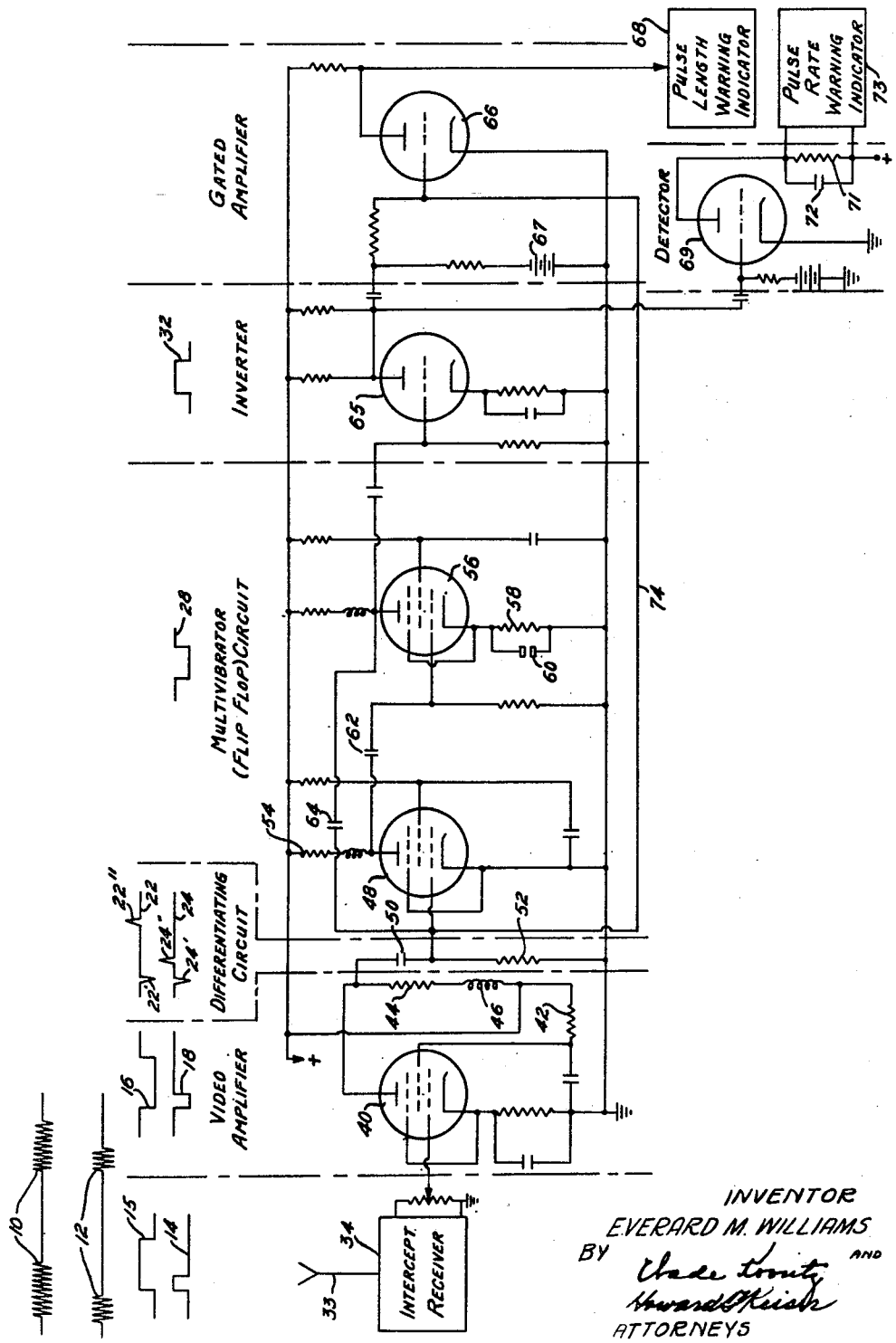

2,522,551

UNITED STATES PATENT OFFICE 2,522,551

RADAR WARNING SYSTEM

Everard M. Williams, Pittsburgh, Pa.

Application October 26, 1945, Serial No. 624,932

8 Claims. (Cl. 343—5)

(Granted under the act of March 3, 1883, as amended April 30, 1928; 370 O. G. 757)

The invention described herein may be manufactured and used by or for the Government for governmental purposes without payment to me of any royalty thereon.

This invention relates to radar warning systems.

In allied aircraft operations over enemy territory one of the major problems is the avoidance of shell bursts from radar-controlled anti-aircraft guns. Devices giving an aircraft crew warning when their aircraft is being tracked by an enemy radar are widely used; in such devices it is necessary to discriminate between the signals of early warning radar sets, for which warning is not required and the signals of gun laying radars, reception of which should give immediate warning. In certain instances, early warning radar has long pulse duration and low pulse repetition rate and gun laying radar has short pulse duration and high pulse repetition rate, and distinction by warning devices between early warning and gun laying signals is based on these differences.

Conventionally employed devices giving such distinction between signals use an oscilloscope on which the duration of the transmitted pulse and the pulse repetition rate are measured. This type of pulse analysis requires a certain amount of calculation, thereby necessitating some time to elapse after the pulse is viewed on the screen of the oscilloscope before it is determined that such pulse designates the presence of the aircraft within gun laying range. This lapse of time may be sufficient to allow tracking data to be fed to the anti-aircraft gun computers and the anti-aircraft shell bursts to become effective. The use of an oscilloscope requires an operator to do the calculating and under stress a human mind is not infallible.

It is, therefore, an object of this invention to provide a system for producing a pulse of predetermined length for comparison with a received pulse so that only when said received pulse is of shorter duration than said produced pulse will a warning indicator be actuated.

Another object is to provide a system wherein only those received pulses having a higher pulse rate than a predetermined pulse rate will actuate a warning indicator.

A further object is to provide an automatic electrical pulse discriminator which may be used in conjunction with a conventional pulse receiver.

Other objects and features of novelty will be apparent from the following description and the annexed drawings, it being clearly understood, however, that the invention is not limited in any way by such description and drawings or otherwise than by the appended claims.

In the drawing is shown a partially schematic circuit diagram of a complete radar warning system embodying the present invention.

As previously stated radar pulses from enemy transmitters may be either of the early warning or gun laying type. The early warning pulse is of greater length and lower pulse repetition rate than the gun laying pulse. If the received pulse is of the gun laying type, it is desirable that warning be given to aircraft within the radar gun laying range so that the aircraft may take counter measures to evade the effect of the anti-aircraft guns by jamming the enemy radar transmitter or taking evasive action. Accordingly, when a radar pulse, either of the early warning type or of the gun laying type is picked up by a receiving antenna, it is coupled to an intercept receiver to produce a square wave pulse which is fed to a video amplifier for amplification. The amplified pulse is then fed through a differentiating circuit which yields a peaked wave form. The peaks are closely spaced for gun-laying pulse and widely spaced for an early warning pulse. The front portion or first peak of the differentiated pulse is used to trigger a one-shot multivibrator (flip-flop) circuit to produce a square wave pulse of predetermined duration. The length of this square wave pulse is determined by the values of the circuit constants of the flip-flop circuit. The square wave pulse is then fed to an inverter stage for phase inversion, the output pulse appearing as a wave form which is 180 degrees out of phase with the output pulse from the flip-flop circuit. The output pulse from the inverter unblanks a gated amplifier into which the differentiated pulse whether of the early warning type or of the gun laying type is fed as a signal. If the trailing peak of the differentiated signal arrives at the gated amplifier during the time that the amplifier is unblanked, the signal will be amplified by the gated amplifier and a warning indicator will be energized. If the incoming pulse is so long that the trailing peak of the differentiated signal appears after the amplifier is blanked again, the signal will not be amplified and no warning will be given by the warning indicator.

As an additional warning measure, when the output pulse from the inverter is fed into the gated amplifier to unblank the amplifier, it is simultaneously fed into a detector stage for detection, the pulse repetition rate of the incoming signal being the same as that of the inverted predetermined pulse, and a voltage is developed across the plate load resistor of the detector tube. This voltage is measured by a pulse rate warning indicator, the voltage developed across the resistor being proportional to the pulse rate. If the pulse signal is of the early warning type the voltage developed across the resistor will indicate a lower pulse rate. Thus, the combined indication of a short pulse and a high pulse rate is certain indication that the pulse received by the intercept receiver is of the gun laying type.

Referring now to the figure of the drawings in which a preferred embodiment of this invention is shown in schematic form, the reference numeral 33 refers to an antenna which is used to pick up the pulse from the enemy radar transmitter. The signal, which is either wave form 10 or wave form 12 depending on the length of the received pulse, is then coupled to intercept receiver 34 which operates in the conventional manner of a superheterodyne radar receiver to produce a square wave pulse 14 or 15 corresponding in length to the length of the received pulse. The pulse output from intercept receiver 34 is coupled to video amplifier 40 which is used in conventional manner to amplify the voltage of the received pulse. The screen grid voltage of tube 40 is supplied through resistor 42 which acts both as a dropping resistor and a filter. The plate load consists of resistor 44 and inductor 46 connected in series. The overall load seen by tube 40 tends to increase with the higher frequencies and, therefore, increases the gain of tube 40 at the higher frequencies. Inductor 46 corrects for the shunting effect of the output capacitance of tube 40 and the input capacitance of tube 48 of the multi-vibrator or flip-flop circuit, which shunting effect normally decreases the gain at the higher frequencies. The receiver output pulses, such as are illustrated by wave forms 14 and 15, are therefore amplified with no change in wave form except for the phase inversion, as shown by wave forms 16 and 18, depending on the pulse length of the received pulse. The output pulse from video amplifier 40 is applied to the differentiating circuit which comprises capacitor 50 and resistor 52 for obtaining a peaked wave pulse 22 or 24, depending on the length of the received pulse. When the applied voltage is of negative polarity, the voltage across capacitor 50 of the differentiating circuit decreases to a minimum value with a small time-delay, while the voltage across resistor 52 drops rapidly to its minimum value and then rises again toward zero. When the applied voltage is changed back to zero or is shorted out, the voltage on capacitor 50 rises again to its original value with a delay in time while the voltage across the resistor rises abruptly to a maximum value and then falls again to zero. The result of this action is a double peaked voltage wave across resistor 52 and a modified saw-tooth wave across capacitor 50. Production of the double peaked wave across resistor 52, as shown by wave forms 22 or 24, depending on the length of the received pulse, is known as differentiating. The peaked wave pulse is then applied as a triggering pulse to the flip-flop circuit. The flip-flop circuit comprises essentially a 2-tube circuit in which one tube is normally conducting while the other tube is normally cut off. Tube 48 of the flip-flop circuit normally conducts with no signal present on its grid since there is no cathode bias resistor in its circuit, thus permitting maximum current to flow. With maximum current flow there is maximum voltage drop across plate load resistor 54 and minimum voltage on the plate of tube 48. Tube 56 of the flip-flop circuit is normally biased by cathode resistor 58 to cut off with no signal present on its grid. Capacitor 60 is connected in parallel with resistor 58 and serves to maintain a stable voltage drop across the resistor with or without a signal pulse. When the negative pulse signal, either wave form 22' or 24' is applied to the grid of tube 48, the current through tube 48 decreases and the voltage drop across resistor 54 decreases, thus increasing the voltage on the plate of tube 48 in a positive direction. The positive pulse is then coupled to the control grid of tube 56 through coupling capacitor 62 causing the control grid of tube 56 to become positive with respect to its cathode, causing plate current to flow in tube 56 and reducing the voltage on the plate of tube 56. This reduction of plate voltage causes the grid of tube 48 to become more negative thus further increasing the positive voltage on the plate of tube 48 and the cycle is repeated until tube 48 is driven beyond cut off. Tube 56 will continue to conduct and tube 48 will remain cut off until coupling capacitor 64 has discharged through resistor 52 to the extent that the bias on the grid of tube 48 is no longer greater than the cut off value of tube 48, at which time the plate current in tube 48 commences to flow, returning the flip-flop circuit to normal with tube 48 conducting until the next incoming pulse from the differentiating circuit starts the cycle again. The duration of the output pulse from the flip-flop circuit is determined by the values of the circuit constants comprising capacitor 64 and resistor 52, the pulse repetition rate being determined by the received pulse. The trailing pulses, either 22'' or 24'' do not affect the flip-flop circuit since they are not of sufficient strength to overcome the bias on tube 48 when it is cut off. The output pulse from the flip-flop circuit, appearing as wave form 28, is capacitively coupled to inverter-amplifier tube 65, the output pulse appearing as wave form 32. The output pulse of inverter-amplifier tube 65 is coupled to the grid electrode of gated amplifier tube 66 simultaneously with the output of the differentiating circuit. Tube 66 is normally biased beyond cut off by battery 67 but is unblanked by the output pulse from inverter tube 65. Only, however, when the trailing pulse signal 22'' or 24'' of the differentiated wave arrives at the grid of amplifier 66 through conductor 74 during the time that amplifier 66 is unblanked by the output pulse from inverter tube 66 will the bias on tube 66 be sufficiently overcome to cause tube 66 to conduct, thus energizing warning indicator 68 which may take the form of a signal lamp on the instrument panel of the aircraft. In order to ascertain the pulse repetition rate of the received signal, the output pulse from inverter tube 65 is fed to detector tube 69 and will be sufficient to overcome the bias on detector tube 69 causing a voltage drop across the plate load consisting of a resistor 71 and a capacitor 72 connected in parallel. When the voltage drop across resistor 71 is low, corresponding to an early warning pulse, indicator 73, which may take the form of another signal lamp on the instrument panel of the aircraft, will not operate since a predetermined voltage is required to operate the warning lamp. When the voltage drop across resistor 71 is high, the lamp will light and indicate reception of a gun laying radar pulse. Indicator 73 may be a voltmeter connected across resistor 71 to measure the voltage drop, a high voltage designating a high pulse rate of a received pulse and a low voltage designating a low pulse rate of a received pulse.

Having thus described my invention, I claim:

1. A pulse warning system comprising a receiver resonant to a predetermined band of frequencies for receiving pulses of electromagnetic energy and transforming them into square wave pulses, means for differentiating each of said square wave pulses so as to obtain a double peaked pulse having a negative and a positive peak, means triggered by the negative peak of said peaked pulse for producing a pulse of predetermined duration, a normally quiescent circuit means adapted to be conditioned for operation by said predetermined pulse, circuit connections for applying said differentiated pulse to said normally quiescent circuit for operating the same, and means connected with said normally quiescent circuit for providing an indication when the positive peak of said peaked pulse occurs within the duration of said predetermined pulse.

2. A system for detecting the character of radiated pulses of electromagnetic energy comprising a pulse receiver for receiving the said pulses and transforming them into square waves of the same length, a differentiating circuit coupled to the output of said receiver for transforming each square wave into a wave having a negative peak and a positive peak, means connected with said differentiating circuit for producing a gate pulse of predetermined length each time a negative peak is produced by said differentiating circuit, a normally non-conductive circuit coupled with said gate pulse producing means, said normally non-conductive circuit being rendered conductive each time a gate pulse is applied thereto, means connecting said differentiating circuit with said normally non-conductive circuit for applying said differentiated pulse to the latter circuit, and means connected with said normally non-conductive circuit for providing an indication whenever a positive peak of the differentiated wave is applied to the last named circuit during the time that the gate pulse is applied thereto.

3. A pulse warning system for indicating the duration of pulses of electromagnetic energy comprising a receiver for receiving said pulses and for producing a square wave pulse of the same length as each received pulse, a video amplifying means for amplifying the square wave pulse from said pulse receiver, a differentiating circuit for differentiating said amplified pulse for obtaining a double peaked pulse having a negative and a positive peak, the duration of said double peaked pulse being directly proportional to the duration of said received pulse, a triggered multivibrator circuit adapted to be triggered by the negative peak of said double peaked pulse for producing a pulse of predetermined duration, means for inverting said predetermined pulse for producing a pulse of the same length as said predetermined pulse but of opposite polarity, a gating circuit conditioned for operation by said inverted pulse, circuit connections for applying said differentiated pulse to said gating circuit for operating the same, and means connected with said gating circuit for providing an indication when the positive peak of said differentiated pulse occurs within the duration of said inverted pulse.

4. A device for determining whether the pulses transmitted by an enemy radio direction and range finding station are of the long, early warning type or of the short, gun-laying type, comprising a pulse receiver for receiving the enemy pulses and transforming them into square waves of the same length, a differentiating circuit coupled to the out-put of said receiver for transforming each square wave into a wave having a negative peak followed by a positive peak, said peaks being spaced apart by a distance approximately equal to the length of the square wave, means connected with said differentiating circuit for producing a gate pulse of predetermined length each time a negative peak is produced by said differentiating circuit, the length of said gate pulse being shorter than the long, early warning pulses, and longer than the short, gun-laying pulses, a vacuum tube normally biased beyond cut-off and thereby rendered nonconductive, means for coupling the input of said vacuum tube with said gate pulse producing means so as to render the tube conductive each time a gate pulse is applied thereto, means connecting said differentiating circuit with the input of said vacuum tube, and means connected with the plate circuit of said vacuum tube and responsive to the current flowing therein for providing an indication whenever a positive peak of the differentiated wave is applied to the input of said vacuum tube during the time when the gate pulse is applied thereto.

5. A pulse warning system for indicating the duration of radiated electromagnetic pulses comprising a pulse receiver for receiving said pulses and for producing a square wave pulse of the same length as each received pulse, video amplifying means for amplifying the square wave pulse from said pulse receiver, a differentiating network for differentiating said amplified pulse for obtaining a double peaked pulse having a negative and a positive peak, the duration of said double peaked pulse being directly proportional to the duration of said received pulse, a one-shot multivibrator circuit adapted to be triggered by the negative peak of said double peaked pulse for producing a negative pulse of predetermined duration, means for inverting said predetermined pulse for producing a pulse of the same length as said predetermined pulse but of opposite polarity, an electronic gating tube having a control grid connected to the output of said inverting means, biasing means connected to the grid electrode of said tube for biasing said tube beyond cut-off with no signal present on the grid thereof, said tube being brought to conductance by said inverted pulse, a warning indicator connected to the plate circuit of said gating tube and responsive to the current flowing therein, and circuit connections for superimposing said double peaked pulse onto said inverted pulse at the grid of said tube whereby operation of said indicator is made dependent on the occurrence of the positive peak of said differentiated pulse within the duration of said inverted pulse.

6. The method of comparing the pulse length of transmitted pulses with that of locally generated pulses of predetermined length which includes the steps of, receiving said transmitted pulses, transforming said received pulses into square wave pulses of the same length as the received pulses, amplifying said square wave pulses, differentiating the amplified pulses for obtaining double peaked pulses each having a negative and a positive peak, generating pulses of predetermined length beginning at the time of the negative peak of each of said double peaked pulses, superimposing each double peaked pulse onto the contemporary predetermined pulse, and producing a warning indication whenever the positive peaks of the double peaked pulses occur within the duration of the predetermined pulses.

7. A pulse warning system as claimed in claim 1 including an additional circuit comprising a detecting device coupled to a time constant circuit, means for applying said pulses of predetermined duration to said detecting device whereby a voltage is developed across said time constant circuit the absolute value of which is a direct function of the repetition rate of said pulses of predetermined length, and an indicating device coupled to said time constant circuit.

8. A device for indicating the presence of a received pulse having a length equal to or less than a predetermined interval of time, said device comprising means triggered by the leading edge of said received pulse for generating a gating pulse having a length equal to the length of the longest received pulse to be indicated, means for producing a sharp pulse from the trailing edge of said received pulse, a gate circuit, indicating means coupled to said gate circuit, and means for applying said gating pulse and said sharp pulse to said gate circuit whereby said indicating means is operated when said sharp pulse occurs during the existence of said gating pulse.

EVERARD M. WILLIAMS.

REFERENCES CITED

The following references are of record in the file of this patent:

UNITED STATES PATENTS

| Number | Name | Date |
|---|---|---|
| 2,113,214 | Luck | Apr. 5, 1938 |
| 2,373,145 | Sensiper | Apr. 10, 1945 |
| 2,403,527 | Hershberger | July 9, 1946 |
| 2,408,079 | Labin | Sept. 24, 1946 |
| 2,418,127 | Labin | Apr. 1, 1947 |

OTHER REFERENCES

Review Sci. Inst., vol. 12, February 1941, pp. 71 to 76.